No. 687,563. Patented Nov. 26, 1901.
E. E. HENDRICK.
SHAFT COUPLING.
(Application filed Feb. 26, 1901.)

(No Model.)

Witnesses:
Jas. F. Coleman
Archibald T. Reese

Inventor
Eli E. Hendrick
By Dyer, Edmonds & Dyer
Att'ys.

UNITED STATES PATENT OFFICE.

ELI E. HENDRICK, OF CARBONDALE, PENNSYLVANIA.

SHAFT-COUPLING.

SPECIFICATION forming part of Letters Patent No. 687,563, dated November 26, 1901.

Application filed February 26, 1901. Serial No. 49,018. (No model.)

*To all whom it may concern:*

Be it known that I, ELI E. HENDRICK, a citizen of the United States, residing at Carbondale, in the county of Lackawanna and State of Pennsylvania, have invented certain new and useful Improvements in Shaft-Couplings, of which the following is a description.

The invention has for its object to produce a shaft-coupling which shall possess maximum strength and which shall consist of but few parts capable of ready and convenient assemblage into operative relation.

In carrying out the invention I employ two shaft-sockets, to which the adjacent ends of two shaft-sections may be secured. One of these sockets is provided upon its free end with a recess, while the other socket is provided on its free end with a projection. Such recess and such projection may, where the device is used for a rotary shaft, be rectangular, so as to preclude relative movement of the shaft-sections. Both sockets are secured in juxtaposition by means of a collar, preferably secured rigidly, although detachably, to one of said sockets and making such contact with a flange upon the other of said sockets as to permit of the movement of the latter relatively to such collar and to the adjacent socket.

The invention is illustrated in the accompanying drawings, in which—

Figure 1:
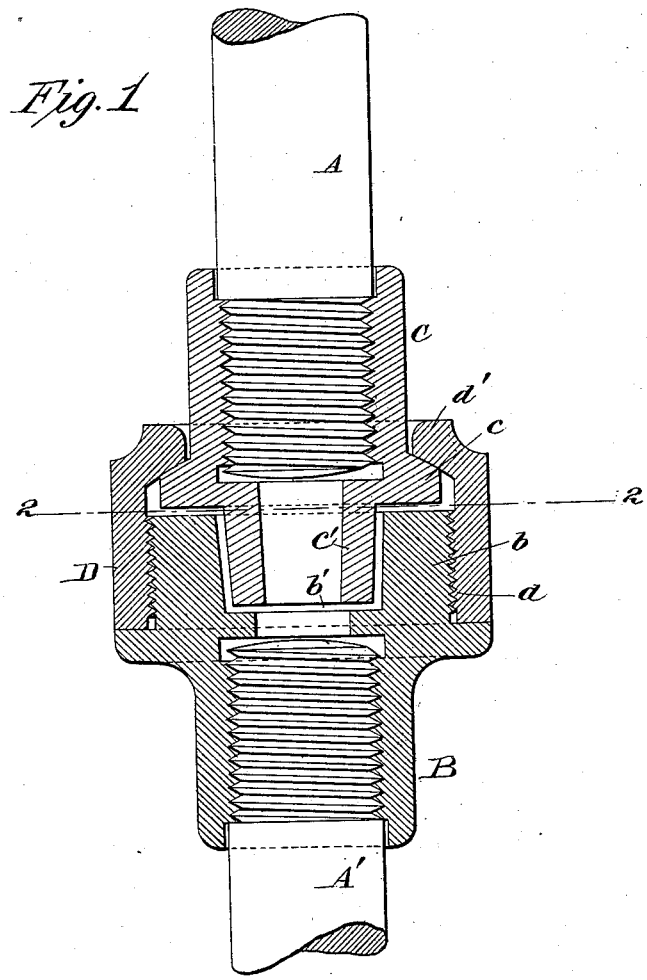
Figure 2:
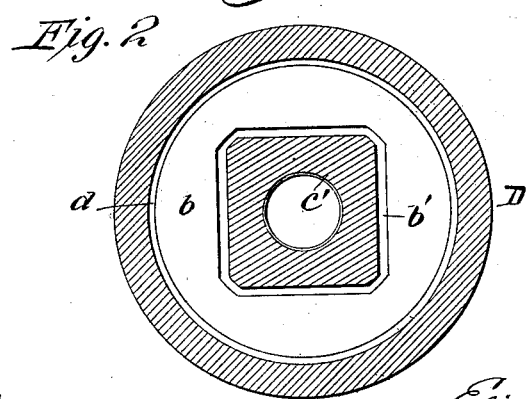

Figure 1 is a vertical section of a shaft-coupling embodying my invention, and Fig. 2 is a transverse section thereof on the line 2 2 of Fig. 1.

Referring to the drawings, in which similar letters denote corresponding parts, A A′ designate two adjacent shaft-sections, the ends of which, as here shown, are screw-threaded.

B designates a shaft-socket interiorly threaded to receive the threaded end of the shaft-section A′. The upper portion $b$ of this socket is provided with a recess $b'$, here shown as substantially square, such recess being designed to coact with a projection upon the socket of the shaft-section A, as hereinafter described.

C designates a second socket, interiorly screw-threaded to receive the correspondingly-threaded end of the shaft-section A. This socket is provided with an annular flange $c$ and with a projection $c'$, here shown as substantially square and somewhat smaller in size than the recess $b'$, formed in the upper surface of the socket B. The projection $c'$ on the socket C may be hollow or solid, as desired.

D designates a collar interiorly threaded at $d$, such threaded portion coacting with the exteriorly-threaded upper portion of the shaft-socket B to secure said collar in position. The upper portion of the collar D is provided with a contracted neck $d'$, coacting with the annular flange $c$ upon the exterior of the shaft-socket C.

In assembling the parts above described so as to couple the ends of adjacent shaft-sections it is only necessary to secure a socket such as B upon the end of one shaft and a socket such as C, with the collar D in position, upon the end of the shaft-section with which connection is to be made. The sockets then being placed in operative relation, as shown in Fig. 1, the collar D may be readily secured upon the screw-threaded portion of the socket B, this operation forcing the projection $c'$ of the socket C into the recess $b'$ of the socket B.

Where independent relative movement of the shaft-sections is immaterial, the projection $c'$ and recess $b'$ may, if desired, be round. Where, however, independent relative rotation is to be avoided, they may, as herein shown, have square or other rectangular form.

What I claim is—

1. In a shaft-coupling, the combination with sockets adapted to receive the adjacent ends of shaft-sections, one of said sockets having a rectangular recess and the other having a rectangular projection coacting therewith, of means for securing said sockets together so as to permit relative movement thereof.

2. In a shaft-coupling, the combination with sockets adapted to receive the adjacent ends of shaft-sections, of a collar secured to one of said sockets and having a contracted neck coacting with the other of said sockets, substantially as set forth.

3. In a shaft-coupling, the combination with sockets adapted to receive the adjacent ends of shaft-sections, one of said sockets having a recess and the other a projection coacting therewith, of a collar secured to one of said sockets and having a contracted neck coacting with the other of said sockets, substantially as set forth.

4. In a shaft-coupling, the combination with sockets adapted to receive the adjacent ends of shaft-sections, of a collar secured to one of said sockets and having a contracted neck coacting with an annular flange upon the other of said sockets, substantially as set forth.

5. In a shaft-coupling, the combination with sockets adapted to receive the adjacent ends of shaft-sections, one of said sockets having a recess and the other a projection coacting therewith, of a collar secured to one of said sockets and having a contracted neck coacting with an annular flange upon the other of said sockets, substantially as set forth.

This specification signed and witnessed this 18th day of February, 1901.

ELI E. HENDRICK.

Witnesses:
L. M. SMITH,
J. R. VANDERFORD.